United States Patent
Sengupta

(10) Patent No.: US 8,850,236 B2
(45) Date of Patent: Sep. 30, 2014

(54) POWER GATING OF CORES BY AN SOC

(75) Inventor: Rudrajit Sengupta, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 516 days.

(21) Appl. No.: 13/163,335

(22) Filed: Jun. 17, 2011

(65) Prior Publication Data

US 2011/0314314 A1  Dec. 22, 2011

(30) Foreign Application Priority Data

Jun. 18, 2010  (IN) ............................ 1712/CHE/2010
Sep. 9, 2010  (KR) ........................ 10-2010-0088528

(51) Int. Cl.
*G06F 1/26* (2006.01)
*G06F 1/32* (2006.01)

(52) U.S. Cl.
CPC .................................. *G06F 1/3228* (2013.01)
USPC ........... 713/300; 713/310; 713/320; 713/321; 713/322; 713/323; 713/324; 713/330; 713/340

(58) Field of Classification Search
USPC .................. 713/300, 310, 320–324, 330, 340
See application file for complete search history.

(56) References Cited

U.S. PATENT DOCUMENTS

| 6,971,034 B2* | 11/2005 | Samson et al. ................ 713/300 |
| 7,571,335 B2* | 8/2009 | Lee ............................... 713/330 |
| 7,788,625 B1* | 8/2010 | Donlin et al. ................. 716/109 |
| 2006/0206737 A1* | 9/2006 | Lee ............................... 713/320 |
| 2009/0204834 A1* | 8/2009 | Hendin et al. ................ 713/323 |
| 2009/0256607 A1* | 10/2009 | Smith et al. .................. 327/198 |

FOREIGN PATENT DOCUMENTS

| JP | 2007180389 A | 7/2007 |
| JP | 2009088533 A | 4/2009 |
| KR | 20100128928 A | 12/2010 |
| KR | 20110036220 A | 4/2011 |

* cited by examiner

*Primary Examiner* — M Elamin
(74) *Attorney, Agent, or Firm* — Myers Bigel Sibley & Sajovec, PA

(57) ABSTRACT

A method for power gating a core by a SoC is provided. Instruction Pointer information, state of the core, core access information and wake up latency information of the core are used in power gating or un-gating of the core. A change in state of the core is detected by a device driver and is provided to a power management unit. As the state of the core changes from active to passive, the wake up latency information and the core access information of the core are retrieved by the SoC from a database to perform either the power gating or the un-gating of the core. The database is prepared by analyzing code blocks statically.

21 Claims, 3 Drawing Sheets

POWER GATING OF CORES BY AN SOC

CROSS REFERENCE TO RELATED APPLICATIONS

This application claims priority under 35 USC §119 to Indian Patent Application No. 1712/CHE/2010, filed on Jun. 18, 2010 in the Indian Intellectual Property Office and Korean Patent Application No. 10-2010-0088528, filed on Sep. 9, 2010 in the Korean Intellectual Property Office (KIPO), the contents of which are herein incorporated by reference in their entirety.

FIELD OF THE INVENTIVE SUBJECT MATTER

The present invention relates, in general, to power consumption in a System-on-Chip "SoC," and, in particular, to improved power gating of cores by the SoC.

BACKGROUND

Power consumption in a System-on-Chip ("SoC") is categorized as dynamic (also known as active) power and static (or leakage) power. Dynamic power varies with the state of the internal modules or cores (also known as circuit blocks or devices or IPs) and can be controlled by using various methods, for example, clock gating. Static power is controlled by the method of power gating. In power gating, the cores that are not in use by the SoC are temporarily turned off to reduce the overall leakage power of the chip. This temporary shutdown time can also be called "low power mode" or "inactive mode." When the cores are required for operation they are activated to "active mode." Thus the known method of power gating minimizes or reduces leakage power by temporarily cutting power off to selective cores that are not required in that mode. However, although power gating saves the leakage power, it may come at the cost of wakeup latency. Typically the CPU may be stalled for several cycles before the gated core can become active. Alternatively, the core could remain active despite any requirement of the CPU to access the core. A SoC consumes some unwanted power in both the scenarios as stated above.

SUMMARY

Methods and systems are provided that eliminate, or at least significantly alleviate, the limitations and drawbacks of the prior art, including those described herein above. Accordingly, a method for power gating one or more cores by a SoC is provided. The SoC tracks instruction pointer information and one or more states of the one or more cores. The instruction pointer information is obtainable by the SoC from the CPU register of the SoC during execution of one or more code blocks by a processor in the SoC. The SoC receives information of a state of a core among the group of cores when the state of the core changes. The SoC receives the information of the state if the state of the core changes from active to passive (e.g. low power). The active state is when a device is either executing a command or waiting for an operation to be completed. A passive state is when a device is idle or not servicing a request.

Depending upon the received information of the state, the SoC then retrieves the wake up latency information and the core access information of the core from a database. The database includes latency information and core access information of the group of cores. The SoC then, during the execution of the one or more code blocks, determines whether the core is required to be used or accessed by the SoC or not. The determination is based on retrieved wake up latency information, core access information associated with the core and the instruction pointer information. Based on the determined requirement, the SoC then either power gates or un-gates the core.

A method for preparing the database is provided. The database is prepared using the wake up latency and the core access information of the group of cores, wherein the core access information of a core is determined by statically analyzing one or more branches of the one or more code blocks. The core access information includes the access time required by the CPU to access the group of cores during the execution of the one or more branches of the one or more code blocks. The SoC then stores the database in a memory.

A SoC for performing the power gating and un-gating of cores is provided. The SoC comprises a memory unit and a controller unit. The memory stores the database that includes the wake up latency information and the core access information of the one or more cores, The core access information includes the access time required by the SoC to access the group of cores determined during static analysis of one or more branches of one or more code blocks by the SoC. The controller unit determines whether the cores are required to be used or accessed by the SoC. The determination is based on the wake up latency information, the core access information, and instruction pointer information. The requirement is determined during execution of the one or more code blocks. The SoC power gates or un-gates the one or more cores based upon the determined one or more requirements.

These methods, system, features and advantages of the present inventive subject matter will become more apparent in the ensuing detailed description of the drawings and embodiments of the present inventive subject matter, which is further defined by the claims.

BRIEF DESCRIPTION OF THE ACCOMPANYING DRAWINGS

The following description of the embodiments of the invention would become more apparent when taken in conjunction with the accompanying drawings, wherein.

DETAILED DESCRIPTION

Figure 1:
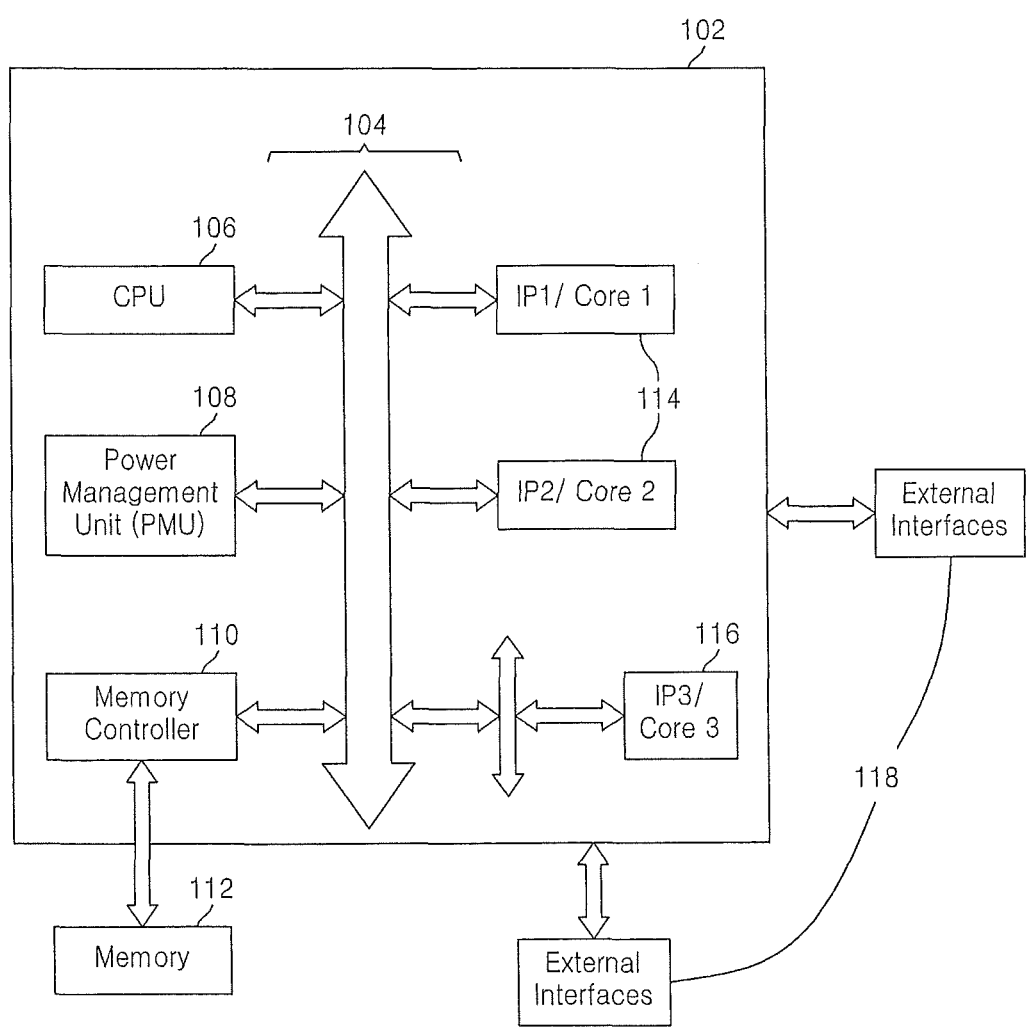
FIG. 1 illustrates, in accordance with some embodiments of the inventive concept, a functional diagram of a SoC.

The inventive concept is described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout the description.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein. Embodiments of the present inventive concept may provide an improved power gating method and system for cores for optimizing power consumption by a SoC.

Advances in integrated circuit technology have made it possible to embed an entire system, including a processor core, a memory unit, a high performance bus, and a programmable logic, in a single semiconductor core, which is often termed as an SoC. SoCs are built using pre-designed models of complex functions known as "cores" or "blocks" or "modules" or sometimes broadly as "devices" (also known as "Intellectual Property" or "IP") that serve a variety of applications. An SoC may typically comprise several such cores that may include, but are not limited to, more than one general purpose processor or computer processor and/or DSPs; a relatively large amount of memory in the possible form of memory arrays, such as ROM and/or RAM and/or EEPROM and/or flash; timing sources that may include oscillators and/or phase-locked loops; and peripherals that may include counter-timers, real-time timers, power-on reset generators; voltage regulators and power management modules; analog interfaces that may include ADCs and DACs; and external interfaces and may include various other elements on a single monolithic substrate. External interfaces may include industry standards, such as USB, FireWire, Ethernet, USART, SPI, etc., whereas analog interfaces may include ADCs and DACs. The SoC may further include communications cores, sound and video cores, radio frequency (RF) cells, etc.

FIG. 1 illustrates, in accordance with some embodiments of inventive concept, a functional diagram of a SoC. As depicted in the FIG. 1, an exemplary SoC 102 comprises a Central Processing Unit 106 ("CPU"), which is the configurable or programmable logical core in the SoC 102 and controls the overall functioning of the SoC 102; a Power Management Unit 108 ("PMU"); a memory controller 110 coupled to a memory 112; and a number of cores that include Core 1, Core 2 114 and Core 3 116. The SoC 102 further includes some external interfaces 118. All these functional cores are interconnected with each other through the system bus 104.

The system bus 104 could be a proprietary or industry-standard bus, whereas Direct Memory Access ("DMA") controllers can route data directly between external interfaces 118 and the memory 112, by-passing the CPU 106 and thereby can increase the data throughput of the SoC 102. Only those functional cores that are used for describing embodiments of the inventive concept are depicted in the FIG. 1. Other functional cores that are not depicted in the FIG. 1 are deemed to be present and operating, either in conjunction or in isolation with the entities depicted in the FIG. 1, in the manner as is known to a person skilled in the art for enabling a proper functioning of the SoC.

Figure 2:
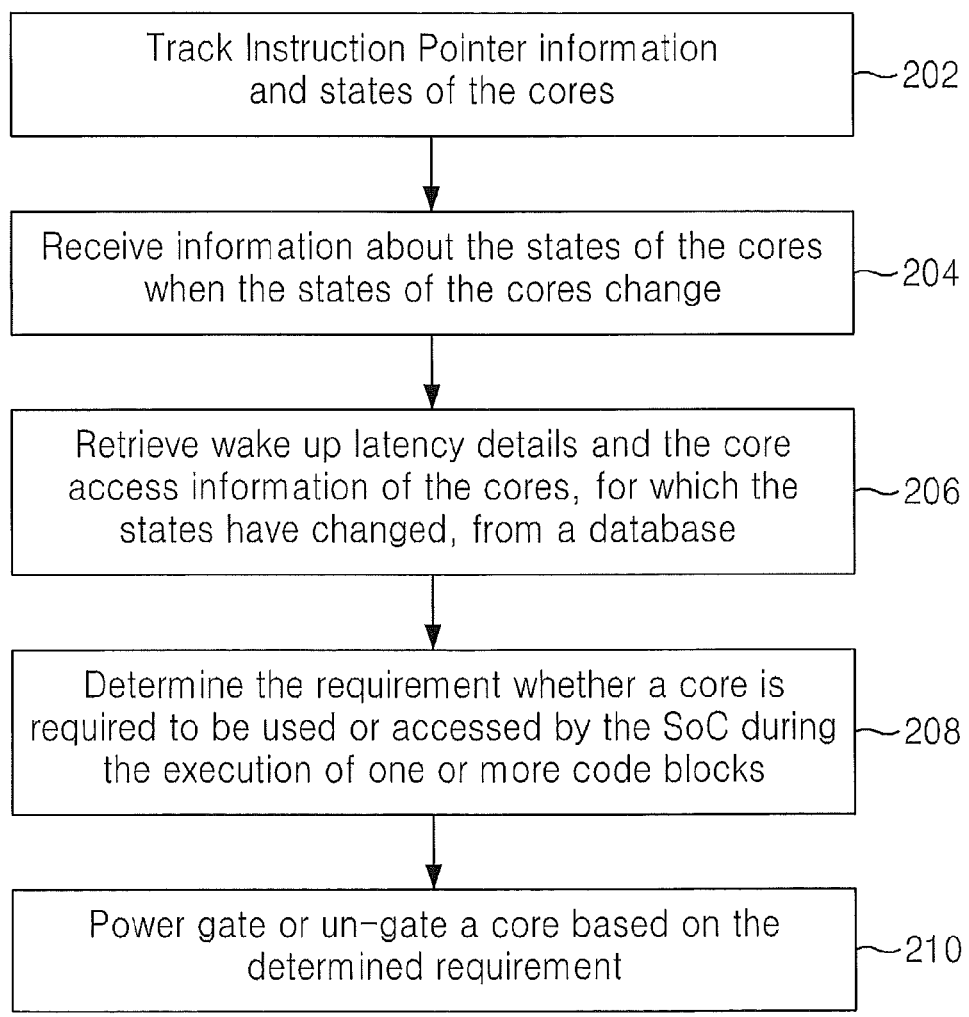
FIG. 2 illustrates, in accordance with some embodiments of the inventive concept, methods for power gating of cores by a SoC.

FIG. 2 illustrates, in accordance with some embodiments of the inventive concept, methods for power gating of cores by a SoC. Embodiments of the methods shall be described by referring to the SoC 102 of FIG. 1. As illustrated in block 202, the SoC 102 tracks the Instruction Pointer information and the states of the cores 114, 116. More particularly, the functional block of the Power Management Unit 108 ("PMU") of the SoC 102 is provided with the option to track the Instruction Pointer information and the states of the cores 114, 116. For example, if the below exemplary code excerpt of T1 from a code block is running on a processor (e.g., firmware) in the SoC, then the Instruction Pointer points to the position say B1 or B2 of the code line or branch of the code excerpt to indicate that the either B1 or B2 is to be executed by the processor.

The Instruction Pointer can be stored in a register inside the CPU 106 which can be the Program Counter. It can also be called a CPU register. Thus, through this tracking of the Instruction Pointer, the PMU 108 becomes aware of the position of the code execution whenever any branch of code from the code blocks of the SoC 102 is executed by a processor of the SoC 102.

| Task T1 |
|---|
| If (condition 1) then<br>-Branch B1 starts . . . ;<br>Else (condition 2) then<br>-Branch B2 starts . . . ; |

| Task T2 |
|---|
| If (condition 3) then<br>-Branch B3 starts . . . ;<br>- . . . ;<br>-ioctl (fd, . . . )  ;<br>- . . . ; |

At block 204, the PMU 108 receives information about the states of the cores 114, 116 if any of the states of these cores 114, 116 changes. For example, if the state of the Core 3 116 changes from active to passive or inactive, that is the Core 3 116 becomes inactive, then the device driver of the Core 3 116 notifies the PMU 108 of this change in status. A device driver of a core can dynamically inform the PMU 108 of the state of the core. An active state of a core can be described as the state when a core is either executing a command or is waiting for an operation to get completed, such as waiting for an interrupt or for a status register to get updated. A passive state of a core can be described as the state when the core is not busy in serving a command, although the power and clock is active for the core.

"Sleep" is a generic term used for a low-power state. In the context of the present inventive subject matter, a power gated state of a core can be considered as a sleep state. Once the PMU 108 receives this information about the change in status of the Core 3 116, the PMU 108 subsequently retrieves the wake up latency details and the core access information of the Core 3 116 from a database. The PMU 108 retrieves the wake up latency details and the core access information of such cores for which the PMU 108 has received information regarding a change in their status, as is illustrated in block 206. In this example, the PMU 108 receives the core status change notification for the Core 3 116. Core wake up latency is the time that a core takes to return to the normal power mode from the sleep or power-gated state. The wake up latency of a core is usually device dependent and fixed.

The wake up latency of a core can be few ticks per second, which can transcend into a time ranging from few nanoseconds to few milliseconds. Tick per second is the unit typically used to refer to the CPU clock cycle. The database, which is stored in the memory 112 and is easily accessible by the PMU 108, is prepared using the wake up latency detail and core access information of each of the cores (cores 114, 116 in this example) of the SoC 102 and is already available before the real time execution of the code blocks. To distinctly refer to this database in this description, the database will be referred to herein as the Core Information Table ("CIT"). The core access information associated with each of these cores 114, 116 of the SoC 102 is determined by statically analyzing all the code blocks of the SoC 102. Referring to the above exemplary code excerpt, a static analysis of the code excerpt can provide the code access information of the cores 114, 116 as is illustrated in FIG. 3.

Figure 3:
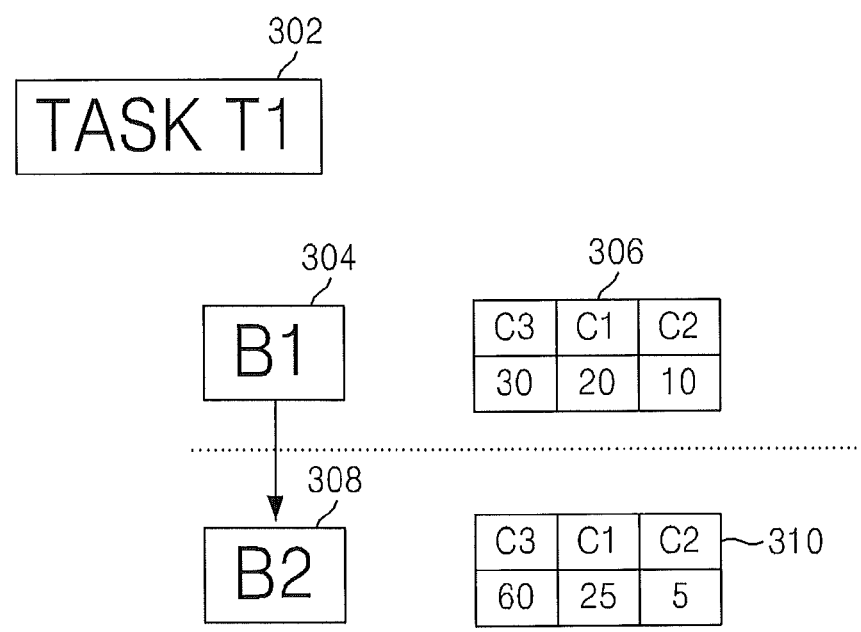
FIG. 3 illustrates, in accordance with some embodiments of the inventive concept, the core access information for the CPU at a branch level of a code block and subsequent preparation of the database.
Figure 3:
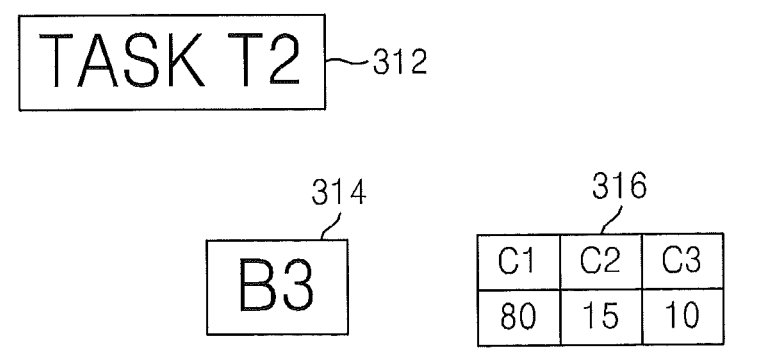

As illustrated by FIG. 3, the Core 2 114 would be accessed or used at 10 ticks from the start of the branch B1 304 when the branch B1 304 of a task T1 302 (the code excerpt from a code block) is executed in real time. Typically a single task (thread) will access a particular core. Analysis of the branch B1 304 under task 1 302 shows that the Core 1 114 would be accessed at 20 ticks from the start of the branch B1 304 and Core 3 116 would be accessed at 30 ticks from the start of the branch B1 304. Similar analysis of branch B2 308, which is under task 1 302, and of branch B3 314, which is under task 2 312, shows that the Cores 1 and 3 114, 116 are accessed at various intervals, which are actually the number of ticks starting from the start of the branches B2 308 and B3 314.

Thus, this static analysis of the code blocks yields the code access information 306, 310, 316 of the Cores 1 and 3 114, 116 in terms of time periods or the number of ticks that are required by the SoC 102 to access the cores 114, 116 from the start of the branches B1 304, B2 308 and B3 314 during the real time execution of the code blocks. The loading (that is storing into memory) of the CIT using the wake up latency details and the core access information of the cores can take place during the SoC 102 boot up. The wake up latency details and the core access information of the cores 114, 116 can either be structured in a tabular form or in a manner as may be suitable for easy and quick retrieval of the information by a processor in the SoC 102 during real time execution of program code. Further, the wake up latency details and all the code access information for the complete code block can be consolidated per core in the CIT.

At block 206, the PMU 108 retrieves the wake up latency details and the core access information of all such cores for which the PMU 108 received the information regarding a change in their state. The PMU 108 then at block 208, as illustrated by FIG. 2, determines whether the cores for which the changes in their status were received are required to be accessed by the SoC 102 or not. For example, during real time execution of the code blocks, if the state of Core 3 116 changes from active to passive, then the PMU 108 receives the notification about this change in state of the Core 3 116 from the device driver of Core 3 116, as illustrated in block 204.

The PMU 108 then retrieves the wake up latency details and core access information of the Core 3 116 from the CIT, as illustrated in block 206. Assuming that the CPU 106 is currently at branch B1 304 of the code block, the PMU 108 has already retrieved this information using the Instruction Pointer, as illustrated in block 202. Using all this information, the PMU 108 determines that the Core 3 116 is required to be accessed at 30 ticks from the start of the branch B1 304. Given the described scenario, the PMU 108 decides to power-gate the Core 3 116. Thus, embodiments of the inventive concept enable the PMU 108 to actually "look-ahead" and predict the inactivity period of the Core 3 116 because the Core 3 116 would not be used in the next few cycles.

Assuming that the latency of the Core 3 116 is 5 ticks, the PMU 108 may further decide to un-gate the Core 3 116 just 5 ticks before its scheduled use, thereby ensuring that the Core 3 116 powers on near the time its service is requested. In another example, a device driver of one of the cores 114, 116 may inform the PMU 108 about a change in the state of one of the cores 114, 116 when the CPU 106 is executing a branch of the code which is not accessing this core. In such a scenario, the PMU 108 may decide to gate or un-gate the core at an appropriate time as may be suitable by using the Instruction pointer information and the CIT. The baseline of the approach according to some embodiments of the inventive concept is that if a core is required to be used or accessed by the SoC 102 then the core is ensured to be active just ahead of the scheduled time of its use by a period equal to the latency time of the core. Thus this method optimizes or improves the power-gating as well as the un-gating of the cores 114, 116, which in turn leads to improved power consumption by 10 the SoC 102.

The PMU 108, which is present in some of the embodiments of the present inventive concept, can be either a functional block or a hardware block. Implementing the PMU 108 as a functional block may involve introduction of the "call-back" mechanism to register with the individual tasks that interact with the cores. Whereas implementing the PMU 108 as a separate hardware block may reduce overhead of the CPU 106. A separate hardware block may also save some additional usage of memory.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

| GLOSSARY OF TERMS AND DEFINITIONS THEREOF | |
|---|---|
| SoC- | System On Chip |
| PMU- | Power Management Unit |
| CPU- | Central Processing Unit |
| IP- | Intellectual Property |
| CIT- | Core Access Information |
| DMA- | Direct Memory Access |
| DSP- | Digital Signal Processor |
| ROM- | Read Only Memory |
| RAM- | Random Access Memory |
| EEPROM- | Electrically Erasable Programmable ROM |
| ADC- | Analog to Digital Converter |
| DAC- | Digital to Analog Converter |
| USB- | Universal Serial Bus |
| USART- | Universal Synchronous Asynchronous Receiver Transmitter |
| SPI- | Serial Peripheral Interface |

That which is claimed:

1. A method for power gating one or more cores by a SoC, wherein the SoC includes a CPU register, the method comprising:
performing operations as follows on at least one processor:
tracking Instruction Pointer information and one or more states of the one or more cores, wherein the Instruction Pointer information is obtainable from the CPU register during execution of one or more code blocks by a processor in the SoC;
receiving information of a first state of a first core from the one or more cores when the first state of the first core changes;
retrieving first wake up latency information and a first core access information of the first core from a database responsive to receiving the information of the first state of the first core, wherein the database includes one or more latency information and one or more core access information of the one or more cores, respectively;
determining a requirement of using the first core by the SoC based on the retrieved first wake up latency information, the first core access information, and the instruction pointer information, during the execution of the one or more code blocks; and
performing one of power gating the first core and un-gating the first core based on the determined requirement.

2. The method of claim 1, wherein retrieving the first wake up latency detail and the first core access information comprises:
preparing the database using the first wake up latency information and the first core access information, wherein the first core access information is determined by statically analyzing one or more branches of the one or more code blocks, wherein the first core access information includes one or more access time required by the SoC to access the first core during the execution of the one or more branches of the one or more code blocks, respectively; and
storing the database in a memory.

3. The method of claim 1, wherein receiving information of the first state of the first core comprises receiving information of the first state of the first core when the first state of the first core changes from an active state to a passive state.

4. An SoC, comprising:
one or more cores;
a memory unit for storing a database, wherein the database includes one or more wake up latency information and one or more core access information of the one or more cores, respectively, wherein the one or more core access information includes one or more access times required by the SoC to access the one or more cores during static analysis of one or more branches of one or more code blocks by the SoC; and
a controller unit for determining one or more requirements of using the one or more cores by the SoC based on the one or more wake up latency information, the one or more core access information, and instruction pointer information during execution of the one or more code blocks and performing one of power gating and un-gating the one or more cores based upon the determined one or more requirements.

5. A method of operating an integrated circuit device comprising:
using a processor that is coupled to a memory to execute program code stored in the memory; and
changing a mode of a core device to low power based on a current instruction of the program code being executed by the processor, latency information associated with activating the core device, and a number of ticks from the execution of a branch instruction by the processor until the core device is accessed by the processor.

6. The method of claim 5, further comprising:
associating the branch instruction of the program code with a number of ticks from the execution of the branch instruction by the processor until the core device is accessed by the processor in a database.

7. The method of claim 6, further comprising:
associating the latency information associated with activating the core device with the core device in the database.

8. The method of claim 7, wherein changing the mode of the core device to low power comprises:
accessing the database to obtain the number of ticks from the execution of the branch instruction and the latency information associated with activating the core device upon receiving a state change notification from the core device.

9. The method of claim 8, further comprising:
changing the mode of the core device to normal after a passage of a number of ticks corresponding to a difference between the number of ticks from the execution of the branch instruction by the processor until the core device is accessed by the processor and the latency information associated with activating the core device as expressed in ticks after execution of the branch instruction by the processor.

10. The method of claim 8, further comprising:
receiving a notification when the state of the core device changes states between an active state and an inactive state.

11. The method of claim 10, wherein accessing the database comprises accessing the database responsive to receiving the notification when the state of the core device changes states.

12. The method of claim 5, wherein the integrated circuit device is a System-on-Chip (SoC) device.

13. An integrated circuit device, comprising:
a processor configured to execute program code;
a core device; and
a power management unit configured to change a mode of the core device to low power based on a current instruction of the program code being executed by the processor, latency information associated with activating the core device, and a number of ticks from the execution of a branch instruction by the processor until the core device is accessed by the processor.

14. The device of claim 13, further comprising:

a database connected to the power management unit and configured to associate the branch instruction of the program code with a number of ticks from the execution of the branch instruction by the processor until the core device is accessed by the processor in a database.

15. The device of claim 14, wherein the database is further configured to associate the latency information associated with activating the core device with the core device in the database.

16. The device of claim 15, wherein the power management unit is configured to change the mode of the core device to low power by accessing the database to obtain the number of ticks from the execution of the branch instruction and the latency information associated with activating the core device upon receiving a state change notification from the core device.

17. The device of claim 16, wherein the power management unit is configured to change the mode of the core device to normal power by changing the mode of the core device to normal power after a passage of a number of ticks corresponding to a difference between the number of ticks from the execution of the branch instruction by the processor until the core device is accessed by the processor and the latency information associated with activating the core device as expressed in ticks after execution of the branch instruction by the processor.

18. The device of claim 16, wherein the power management unit is further configured to receive a notification when the state of the core device changes states between an active state and an inactive state.

19. The device of claim 18, wherein the power management unit is configured to access the database responsive to receiving the notification when the state of the core device changes states.

20. The device of claim 13, wherein the device is a System-on-Chip (SoC) device.

21. A method of generating a database for storage in a memory, comprising:

performing operations as follows on at least one processor:

analyzing program code to identify a branch instruction therein;

for each of a plurality of core devices, determining a number of ticks from the execution of the branch instruction by a processor until the respective core device is accessed by the processor; and associating in the database the determined number of ticks and a latency for activating each of the plurality of core devices.

* * * * *